April 28, 1936. A. SCHOBER ET AL 2,039,192
BEARING FOR THE TRUNNIONS OF LADLES AND THE LIKE
Filed July 5, 1934
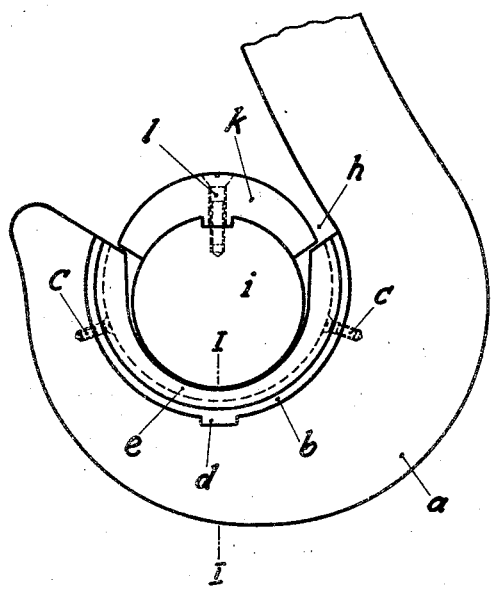
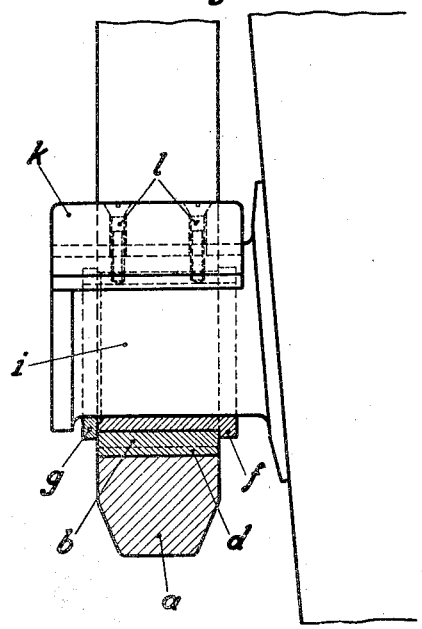
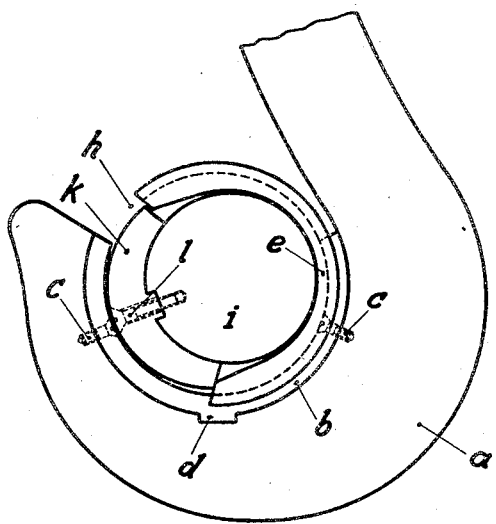
Inventors.
A. Schober and
By A. Wegmann.
W. S. Evans
Attorney Patented Apr. 28, 1936

2,039,192

UNITED STATES PATENT OFFICE 2,039,192

BEARING FOR THE TRUNNIONS OF LADLES AND THE LIKE

Alfred Schober, Dortmund, and Alfred Wegmann, Dortmund-Wambel, Germany

Application July 5, 1934, Serial No. 733,938
In Germany July 18, 1933

4 Claims. (Cl. 308—36.1)

This invention relates to a bearing for the trunnions of ladles and other containers—such as steel ladles, in crane-hooks and for trucks for cast-iron, pig-iron and the like. Such bearings are necessary for facilitating the operation of tipping the ladles. The bearing usually employed consists of a shell secured to the body of the bearing body and into which a trunnion of the ladle is inserted. This construction has the disadvantage that pieces of slag which accumulate in the shell cause rapid wear of the trunnion inasmuch as the slag becomes crushed and acts like emery.

According to the invention the trunnion bearing has a discontinuous and rotatable lining, which remains always in position in the bearing, and into which the trunnion is inserted while at the same time being prevented from rotating relatively thereto. By this construction the sliding surface of the bearing is completely covered in the position of the bearing shown in Figure 1 by the lining which embraces the trunnion. In this position the falling on to the bearing of pieces of slag from the ladle filled with pig-iron may occur. Damage to the relatively rotatable parts, however, is avoided since the lining completely envelops the slide surface. The clearance between movable lining e and fixed lining b at their upper edges is relatively small, so that little or no slag enters into it; whereas in the old type of construction the clearance between the trunnion's surface and the surface of its bearing was large, which caused much slag to enter between the bearing surfaces. During the movement from the position to the tipping position of the ladle pieces of slag that may have fallen on the exposed slide surface of the bearing are forced off the bearing surface in the return of the ladle to the original position by the lining member as it travels upon the slide surface. If the trunnion be passed through the break in the lining to rest on the lining in the bearing and the apparatus of which the trunnion forms part is tilted, the lining will move round in the bearing with the trunnion, but there will be no relative movement between the lining and the trunnion. Thus foreign bodies present on the lining cannot be crushed between the trunnion and the bearing, that is to say, between the relatively rotating parts. Consequently the trunnion is in very great measure protected.

The movement of the lining by the trunnion during the tipping movement of the ladle may be effected by the static friction between the two parts. In order, however, to ensure greater certainty of movement the lining in the bearing can be positively rotated with the trunnion by a fitting or lining element secured to the trunnion. For this purpose use is advantageously made of the break in the lining in the bearing, on which the trunnion rests; the trunnion being inserted through the break and being covered by a fixed section of lining corresponding to the omitted part of the lining in the bearing. The fixed lining of the trunnion lies against the bearing shell when the ladle is in the tipping position.

In the construction according to the invention the bearing surface on which the lining in the bearing moves can be lubricated so that the device acts effectively. Such lubrication was useless in the constructions of the device as hitherto employed for the reason that foreign bodies collected on the surface, upon which movement takes place.

In the accompanying drawing, one construction of the device according to the invention is illustrated, by way of example, in its application to a crane-hook.

Figure 1 is a side elevation.

Figure 2 is a cross-section on the line I—I of Figure 1.

Figure 3 is a side elevation of the device according to the invention in the tipping position of the ladle.

Referring to the drawing, the bearing shell $b$ is secured by means of screws $c$ in the crane-hook $a$ to serve as a bearing surface and is prevented from turning by means of a projecting part $d$. The lining $e$ in the bearing is provided capable of rotational movement on the bearing shell $b$; the lining $e$ is prevented from slipping off in the lateral direction by the projecting parts $f$, $g$. The lining $e$ does not form a closed ring, but is cut away at $h$ so that the trunnion $i$ can be placed in position therein. A section of lining $k$ is secured to the trunnion $i$ by means of screws $l$, which section of lining is accommodated with a close fit in the cut-away portion $h$ of the lining $e$.

When the ladle is being tipped, that is, when the trunnion $i$ is being turned, the lining $e$ is positively turned by the fixed lining $k$ (Figure 3). By this means the trunnion $i$ is prevented from movement relatively to the lining $e$. Consequently foreign bodies in the lining $e$ cannot affect the trunnion $i$. On the other hand the slide surface of the bearing shell $b$ is protected by the lining $e$ against penetration by foreign bodies while the lining is in the position shown in Figure 1 since the lining $e$ completely covers the slide surface. Extraneous foreign bodies which during the movement of the lining from the inoperative position to the position in which the ladle is tipped fall upon the exposed slide surface of the bearing shell *b* are carried off the said surface by the lining *e* during its return to the inoperative position. Lubricant is introduced between the bearing shell *b* and the lining *e* so that the relative rotary movement is facilitated.

The fixed lining *k* of the trunnion *i* lies against the bearing shell *b* while the parts are in the tipping position (Figure 3).

One particular advantage of this bearing consists in the fact that the lining *e* can be changed on the spot without any need for dismantling the hook, while in the case of known constructions, this operation has to be carried out in the workshop.

We claim:

1. In ladles and the like, a supporting trunnion, a discontinuous bearing into which the trunnion may enter through the break therein, a discontinuous lining fitted rotatably in the said bearing and in which the said trunnion may rest, and means to constrain the said trunnion and the said lining from relative movement in order that the lining may rotate in the bearing with the trunnion.

2. In ladles and the like, a supporting trunnion, a discontinuous bearing into which the trunnion may enter through the break therein, a discontinuous lining fitted rotatably in the said bearing and in which the said trunnion may rest, and abutments provided upon the said trunnion which come to lie respectively adjacent the ends of the lining bounding the break therein and positively move the lining in the bearing on the rotation of the trunnion.

3. In ladles and the like, a supporting trunnion, a discontinuous bearing into which the trunnion may enter through the break therein, a discontinuous lining fitted rotatably in the said bearing and in which the said trunnion may rest, and a lining element secured to the trunnion, the said element being accommodated in the break of the lining when the trunnion is in position therein.

4. In ladles and the like, a supporting trunnion, a discontinuous bearing into which the trunnion may enter through the break therein, a discontinuous lining fitted rotatably in the said bearing and in which the said trunnion may rest, and a lining element secured to the trunnion, the said element being accommodated in the break of the lining when the trunnion is in position therein, the said lining element fitting closely within the break of the lining and closing the latter against the penetration of foreign matter.

ALFRED SCHOBER.
ALFRED WEGMANN.